Feb. 6, 1934.  T. O. HALL  1,946,139
PROJECTOR FOR DOUBLE DISSOLVING EFFECTS
Filed Nov. 15, 1930  2 Sheets-Sheet 2
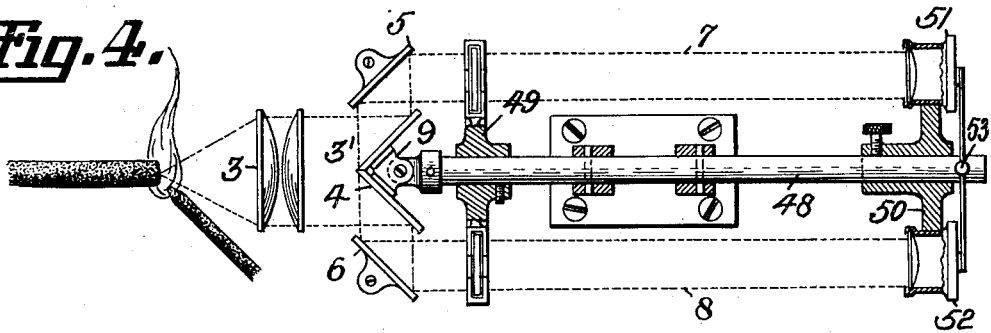
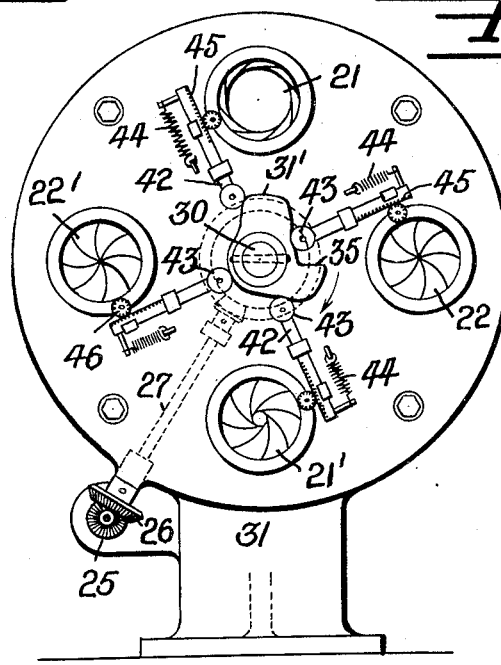
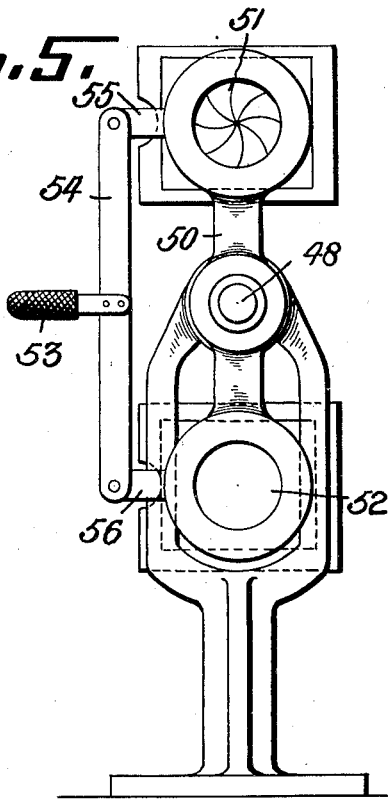
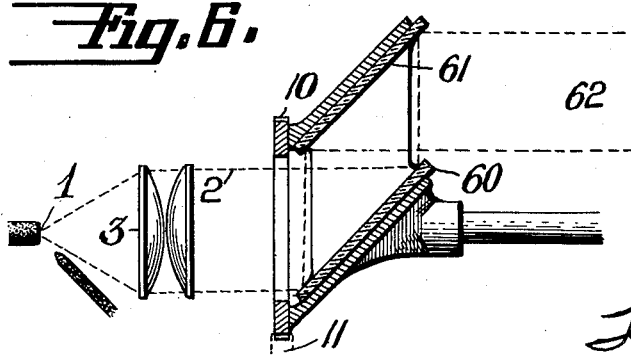
INVENTOR
Theodore O. Hall.
BY Herbert H. Thompson
his ATTORNEY.

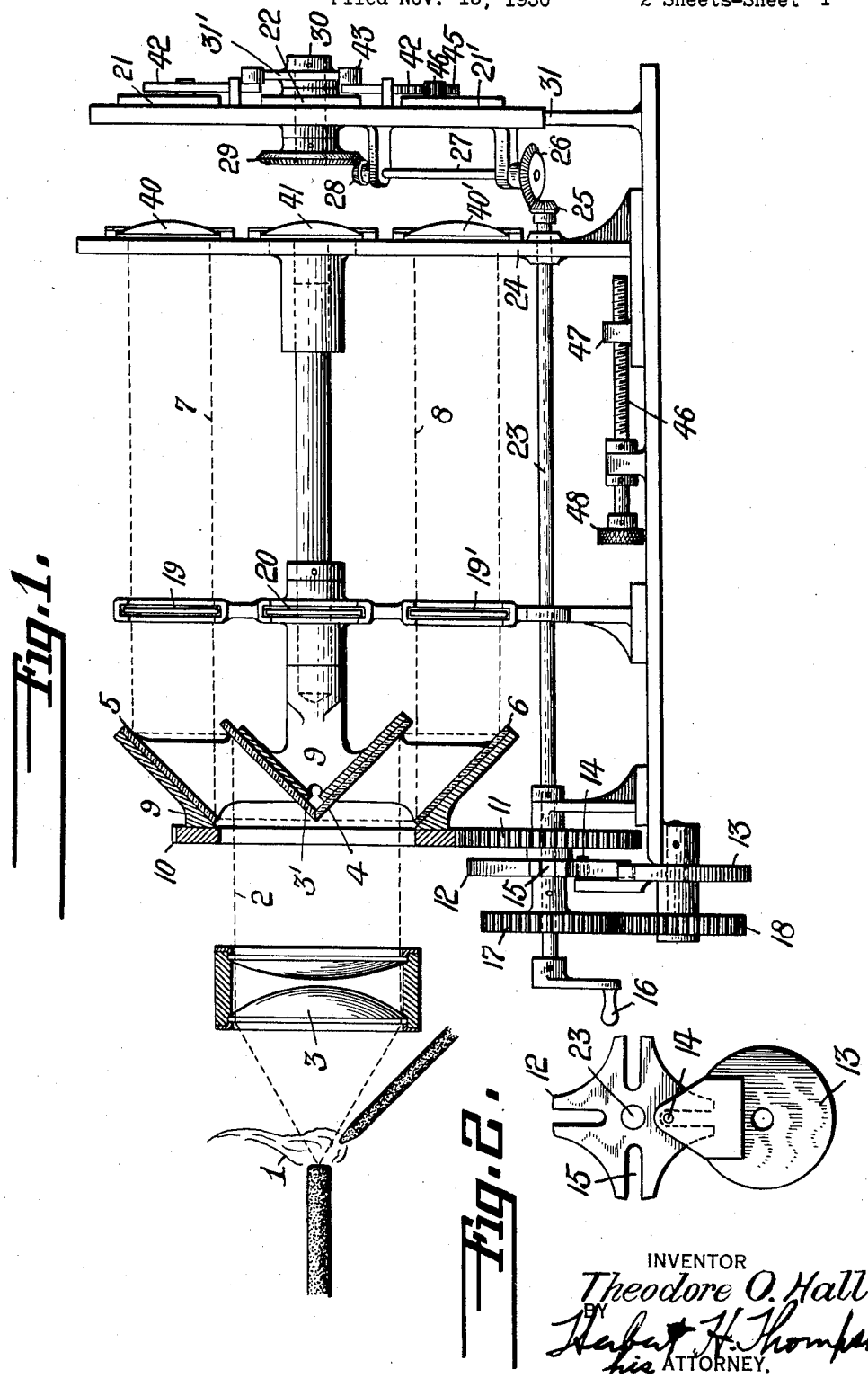

Patented Feb. 6, 1934

1,946,139

UNITED STATES PATENT OFFICE 1,946,139

PROJECTOR FOR DOUBLE DISSOLVING EFFECTS

Theodore O. Hall, New York, N. Y., assignor to Hall & Connolly, Inc., New York, N. Y., a corporation of New York Application November 15, 1930
Serial No. 495,811

10 Claims. (Cl. 88—24)

This invention relates to projectors for lantern slides or colored spot or flood lights in theatres and the like. More particularly my invention relates to an improvement in the class of machines used to produce double dissolving pictures or other "effect" work wherein, in the past, it has been the custom to employ two separate lamp units. By my invention, I accomplish a superior result with a single light source, and in addition am able to produce a succession of dissolving pictures which may be used, if desired, to give a motion picture effect.

Referring to the drawings illustrating several forms of the invention,

Fig. 1 is a side elevation, partly in section, of the preferred form of the invention, the mechanism being shown in simplified form for illustrative purposes.

Fig. 2 is a detailed front elevation of the escapement means for intermittently revolving the beams.

Fig. 3 is a front elevation of the lamp mechanism showing the shutter operating means.

Fig. 4 is a side elevation, partly in section, of a simplified form of my invention in which the beams are fixed.

Fig. 5 is a front elevation of the same.

Fig. 6 is a diagrammatic view of another modification employing a single swinging beam.

As the single source of light, I prefer to use a high intensity flaming arc 1, the beam from which is collected and projected as a parallel beam 2 by collector lenses 3. The beam is then divided or split into preferably two beams by a pair of reflectors, such as mirrors 3' and 4, each arranged at preferably 45° to the axis of beam 2 and reflecting the beams on to a second pair of 45° mirrors 5 and 6, so that two substantially parallel beams 7 and 8 are formed. In reality, however, the beams are slightly convergent, both being focused on the same screen.

In the preferred form of my invention the mirror holder 9 is rotatably mounted and means are provided to rotate the two beams intermittently about the aforesaid axis of beam 2. For this purpose gear teeth 10 are provided on holder 9, which mesh with a pinion 11 secured to a star wheel 12. The star wheel is intermittently turned by a disc 13 having a pin 14 thereon which engages slots 15 in the star wheel. Disc 13 may be turned from hand crank 16 through gears 17 and 18. As shown the star wheel provides four positions for the mirror frame, which gives two positions for the parallel beams. Accordingly I provide four transparent slide holders 19, 19' and 20, four objective lenses 40, 40' and 41, and four shutters 21, 21' and 22, 22' which are preferably of the iris type. The pair of shutters having no beam thereon is normally maintained closed, while the other pair is operated to give the dissolving effect hereinbefore described. Preferably the shutter operation is automatically controlled from the handle operating the beam rotating device, so that a plurality of dissolving pictures may be shown in rapid succession. For this purpose the shaft 23 of crank 16 is extended through objective lens frame 24 and is connected as by bevel gear 25, 26, shaft 27 and pinion 28 to a bevel gear 29 pinned to a shaft 30 which is journalled in the shutter frame 31 in the optical center of the system. To said shaft 30 is also connected a cam 31' or other means to operate the shutters in the desired sequence as the beams are revolved. To operate the shutters, four shafts 42 are shown, each provided with a cam engaging roller 43 which is held against the cam by spring 44. Each shaft has rack teeth 45 which rotate pinion 46 adjacent each shutter, the pinions operating the iris shutter in the usual manner. In the position of the cam shown in Fig. 3, shutters 22 and 22' are closed, shutter 21 is starting to close as shutter 21' is starting to open. This will continue until shutter 21' is wide open and shutter 21 closed. As the operator continues to turn crank 16, the beams will be snapped over to the horizontal position thus leaving lenses 40 and 40' and shutters 21 and 21' and engaging the other pair of lenses and shutters. As this happens, roller 43 of shutter 21' engages the steep part 35 of cam 31 to snap shutter 21' closed as shutter 22 starts to open. As the cam is further rotated, shutter 22 will first open to the full and then start to close as 22' starts to open, and the cycle above described with respect to shutters 21 and 21' repeated. In other words, four pictures are produced in sequence, the first appearing with gradually increasing intensity, then dissolving into number 2. Number 3 then gradually appears as number 2 disappears, number 3 in turn dissolving into number 4, which finally disappears as number 1 again gradually comes into view.

The focal adjustment may be obtained by adjusting the frame 24 carrying the objective lens. For this purpose a shaft 46 is threaded through a lug 47 on the base of frame 24 so that by turning the thumb piece 48 the lens carriage may be adjusted.

It will be, of course, understood that the number of positions of the rotating beams may be either increased or diminished to suit the particular requirements. In Figs. 4 and 5 I have illustrated a much simpler form of my invention in which the split beams 7 and 8 are fixed. In this case the frame 9 supporting the mirrors 3' and 4 may be fixed to a central shaft 48, the slide holder frame 49 and the combined lens and shutter supporting frame 50 being supported on the same shaft. In this form of the invention a much simpler mechanism may be provided for operating the iris shutters 51 and 52. For this purpose there is provided a handle 53 secured to a link 54 connected at top and bottom to levers 55 and 56 which operate respectively the iris shutters 51 and 52 by the usual linkages (not shown). The linkage is so arranged that moving the handle in one direction opens shutter 51 and closes shutter 52, and vice versa.

The revolving beam principle for producing a succession of pictures, either of the still or motion type, may also be employed by using a single instead of a multiple beam, as illustrated in Fig. 6. According to this figure the entire main beam 2 is reflected by the 45° mirror 60 and is again reflected by the mirror 61 to produce a beam 62 slightly convergent to the axis of the main beam 2 and revoluble about said axis, so that all pictures are thrown on the screen in the same spot for each step by step position of the beam. The mirror systems 60—61 may be revolved by a similar mechanism as shown in connection with Fig. 1 and the lens and shutter mechanisms may be also similar.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a projector lamp, a plurality of iris shutters arranged about a common center, cam means for oppositely operating diametrically opposite members of each pair progressively, and means for projecting substantially parallel twin beams in progressive positions corresponding to the position of the operating shutters.

2. A projector lamp for dissolving picture effects comprising a single light source, a rotatably mounted reflector for producing a beam substantially parallel to but spaced from the original beam, means for rotating said reflector about the axis of the original beam into a plurality of positions, and object holders and lens systems for each position of the reflected beams.

3. A projector lamp for dissolving picture effects comprising a single light source, a rotatably mounted double V-shaped reflector for splitting the light beam and adapted to be intermittently rotated to a plurality of positions, a fixed reflector for each position to project a beam parallel to the original beam but spaced therefrom, object holders and lenses for each position of said spaced beams, a shutter for each of said lenses, and a common means for intermittently rotating said reflector and for operating the shutters in sequence therewith for producing a succession of dissolving pictures.

4. A projector lamp for dissolving picture effects comprising a single light source, a rotatably mounted reflector system for producing a beam substantially parallel to the original beam but spaced therefrom, object holders and lenses for each position of the reflector, an iris shutter for each lens, and a common means for intermittently rotating said reflector and for operating the shutters in sequence therewith for producing a succession of dissolving pictures.

5. In a projector lamp, a plurality of iris shutters arranged about a common center, cam means for oppositely operating diametrically opposite members of each pair progressively, a single light source, means for splitting the beam therefrom into two beams parallel to but spaced from the axis of the original beam and from each other, means for rotating said parallel beams into the successive positions of said shutters, and a common means for operating said rotating and cam means.

6. A projector lamp for dissolving picture effects comprising a single light source, a rotatably mounted reflector system for producing a beam substantially parallel to the original beam but spaced therefrom, object holders and lens systems for each position of the reflector, iris shutters for each position, and means for gradually opening and closing each shutter in turn while the light beam engages the same.

7. A projector lamp for dissolving picture effects comprising a single light source, a rotatably mounted double reflector having the two halves thereof positioned at an angle to each other for splitting the light beam into two beams, means for intermittently rotating said reflector about an axis parallel to the axis of the original beam from one to another of a plurality of positions, and an object holder and lens system for each of said positions of the reflector.

8. A projector lamp for dissolving picture effects comprising a single light source, a rotatably mounted double reflector having the two halves thereof positioned at an angle to each other for splitting the light beam into two beams, means for intermittently rotating said reflector about an axis parallel to the axis of the original beam from one to another of a plurality of positions, an object holder and lens system for each of said positions of the reflector, a shutter for each lens system, and means for opening each shutter as said reflector pauses at its position while maintaining the others closed.

9. In a projector lamp, a light source, means for producing a beam therefrom, a double reflector system placed in said beam for producing a beam parallel to but spaced from the original beam, means for intermittently revolving said reflector system from one position to another about the axis of said first-named beam to revolve the parallel reflected beam about said axis, and an objective lens for each of said positions of the reflected beam.

10. In a projector lamp, a light source, means for producing a beam therefrom, a double reflector system placed in said beam for producing a beam parallel to but spaced from the original beam, means for intermittently revolving said reflector system from one position to another about the axis of said first-named beam to revolve the parallel reflected beam about said axis, an objective lens for each of said positions of the reflected beam, a shutter for each of said lenses, and means for gradually opening and closing each shutter in turn while the light beam engages the same.

THEODORE O. HALL.